United States Patent
Nemmaier et al.

(10) Patent No.: US 10,481,850 B2
(45) Date of Patent: Nov. 19, 2019

(54) CONTROLLER TO CONTROL AN APPARATUS, PRINTING DEVICE, AND METHOD FOR OPERATING SUCH A CONTROLLER

(71) Applicant: Océ Holding B.V., Venlo (NL)

(72) Inventors: Christoph Nemmaier, Munich (DE); Martin Kropf, Constance (DE)

(73) Assignee: Océ Holding B.V., Venlo (NL)

( * ) Notice: Subject to any disclaimer, the term of this patent is extended or adjusted under 35 U.S.C. 154(b) by 34 days.

(21) Appl. No.: 15/820,630

(22) Filed: Nov. 22, 2017

(65) Prior Publication Data
US 2018/0150272 A1 May 31, 2018

(30) Foreign Application Priority Data
Nov. 25, 2016 (DE) .................. 10 2016 122 766

(51) Int. Cl.
*G06F 3/12* (2006.01)
*G05B 15/02* (2006.01)
*G06K 15/00* (2006.01)

(52) U.S. Cl.
CPC .......... *G06F 3/1279* (2013.01); *G05B 15/02* (2013.01); *G06F 3/1218* (2013.01); *G06F 3/1224* (2013.01); *G06F 3/1273* (2013.01); *G06F 3/1288* (2013.01); *G06K 15/405* (2013.01); *G06K 15/4025* (2013.01)

(58) Field of Classification Search
None
See application file for complete search history.

(56) References Cited

U.S. PATENT DOCUMENTS

| | | | |
|---|---|---|---|
| 6,880,035 B1 | | 4/2005 | Groeger et al. |
| 2007/0083275 A1* | | 4/2007 | Law |
| 2010/0177335 A1* | | 1/2010 | Oh |

FOREIGN PATENT DOCUMENTS

| | | |
|---|---|---|
| DE | 19846913 A1 | 4/2000 |
| DE | 102005062576 B4 | 10/2012 |

OTHER PUBLICATIONS

Foreign action for German application 10 2016 122 766.8 dated Aug. 4, 2017.
RadiSys Corporation: iRMX Network User's Guide and Reference, Kapitel 1,2,7-9, 1999. URL: http://www.tenasys.com/wp-content/uploads/2016/08/NetworkUserGuideAndRef.-pdf [abgerufen Apr. 8, 2017].

* cited by examiner

*Primary Examiner* — Syed A Roni
(74) *Attorney, Agent, or Firm* — Schiff Hardin LLP

(57) ABSTRACT

A controller to control an apparatus (e.g. a printer) can include multiple secondary sub-controllers and a main sub-controller. Each of the secondary sub-controllers can have an operator process and one or more executable control processes. Each of the control processes can be configured to exchange data with one or more other of the control processes. The main sub-controller can be communicatively coupled to the secondary sub-controllers via a data network. Each of the main and secondary sub-controllers can include at least one processor and an operating system. The respective operator processes can be configured to communicate via the data network, and the control processes of each of the secondary sub-controllers can be configured such that the control processes communicate exclusively with the operator process of their respective secondary sub-controller to communicate via the data network.

16 Claims, 2 Drawing Sheets

CONTROLLER TO CONTROL AN APPARATUS, PRINTING DEVICE, AND METHOD FOR OPERATING SUCH A CONTROLLER

CROSS REFERENCE TO RELATED APPLICATIONS

This patent application claims priority to German Patent Application No. 102016122766.8, filed Nov. 25, 2016, which is incorporated herein by reference in its entirety.

BACKGROUND

The present disclosure relates to controller configured to control an apparatus. The controller can include multiple sub-controllers which are connected via a data network. The present disclosure also relates to a printing device having such a controller and a method for operating such a controller.

Systems exist for the administration of data on distributed hardware platforms which comprise multiple modules. Examples of these are CORBA (Common Object Request Broker Architecture) or SMMP. With CORBA, platform-spanning protocols and services are defined so that a platform-spanning data exchange is possible. An important CORBA service is the naming service, which enables server objects to be addressed by means of an established name. It is common to these known systems that the resolution of the object references via object names is separate from the transport of the data. For example, object names are hereby associated with specific processes and the data administered by them at the individual modules, with which object names a connection between these processes may be established by means of the naming services so that these processes exchange data directly with one another.

Given use of these systems in a controller having multiple modules, a main module and multiple sub-modules are often provided. In such systems, a communication process that implements the communication with the individual processes and sub-modules is executed in the main module. If the processes of the sub-modules should exchange data in such a system, the individual processes then send the data to the communication process of the main module, and thus then relays the data to the respective process of a sub-module that should receive the data.

In DE 10 2005 062 576 B4, a controller is described which is designed for printing devices and has a parallel data bus that is connected with multiple assemblies. The assemblies additionally have an interface to a serial data communication for serial transfer of data. Larger data sets are transferred via the serial data connection, where the structure of the serial data connection occurs using the parallel data bus and a switching matrix.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

Figure 1:
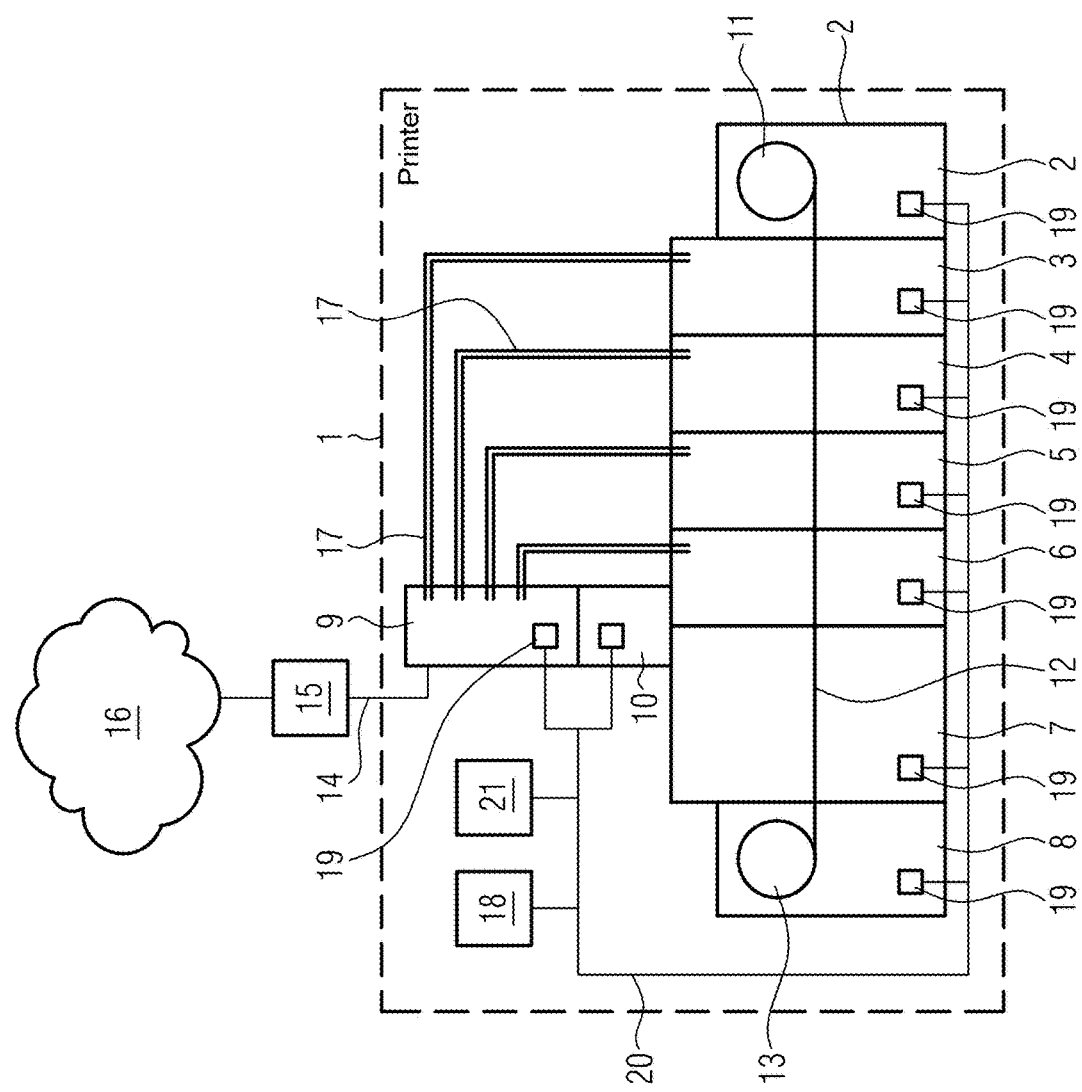
Figure 2:
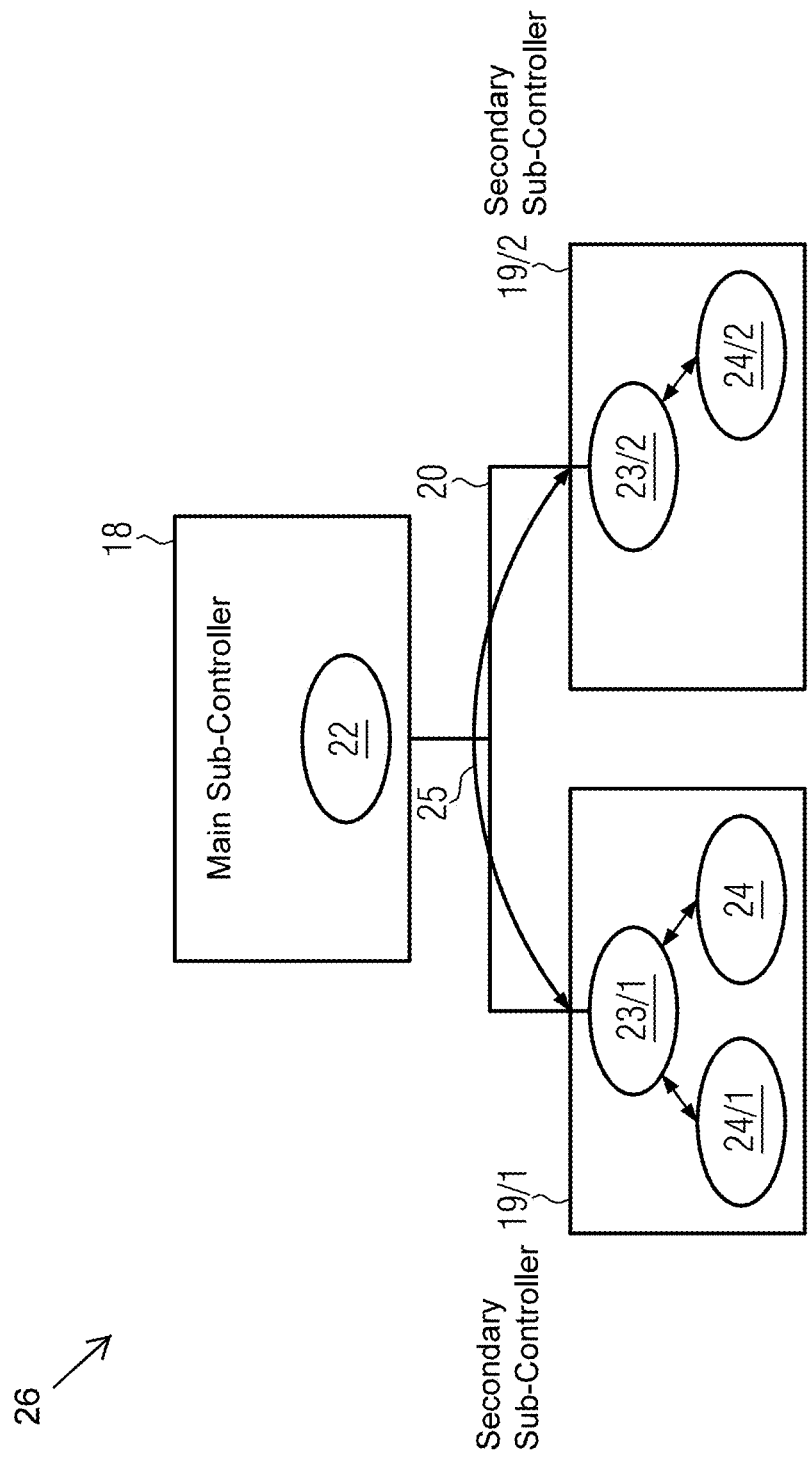

FIG. 1 illustrates a block diagram of a printing device having a controller, and a main sub-controller and two secondary sub-controllers with a data network, according to an exemplary embodiment of the present disclosure, and FIG. 2 illustrates a block diagram of a controller having a main sub-controller and two secondary sub-controllers according to an exemplary embodiment of the present disclosure.

The exemplary embodiments of the present disclosure will be described with reference to the accompanying drawings.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure.

The present disclosure relates to a controller configured to control an apparatus. The controller can include multiple sub-controllers which are connected via a data network, as well as a printing device having such a controller. The disclosure also relates to a method for operating such a controller, which, in a simple manner, allow a more efficient data transfer than the aforementioned systems, and in addition can be implemented simply and executed reliably.

A controller according to the present disclosure configured to control an apparatus. The controller can include multiple sub-controllers which are connected via a data network. In an exemplary embodiment, each sub-controller includes at least one processor and an operating system. In an exemplary embodiment, one of the sub-controllers is configured as a main sub-controller and the other sub-controllers are configured as secondary sub-controllers. In operation, one or more control processes which may exchange data with other control processes are stored and executable at each—secondary sub-controller. In this example, each secondary sub-controller has an operator process which is configured to communicate via the data network, and the control processes of each secondary sub-controller are configured such that they communicate exclusively with the one operator process of their secondary sub-controller for communication via the data network.

In conventional systems, names are associated with the individual processes so that processes of different modules may communicate directly with one another. In one or more embodiments of the present disclosure, each secondary sub-controller has an operator process via which the control process or processes of the respective secondary sub-controller communicate with the data network. The present disclosure hereby provides an additional process, the operator process. In an exemplary embodiment, the operator process is a single process of the respective secondary sub-controller that the "infrastructure" must keep ready for communication with the data network. If data is transferred via the data network (e.g. according to the Transmission Control Protocol (TCP) protocol), then each process that communicates with the data network must provide its own stack and its own instruction pointer. One or more ports are assigned to this process. The more processes of a sub-controller that are coupled to the data network, the greater the consumption of resources, and the more complex the association of the processes with one another. This is avoided with the present disclosure.

In one or more exemplary embodiments of the present disclosure, even if an additional process is necessary relative to the aforementioned systems with the operator process, the complexity of the entire communication structure is significantly reduced since each secondary sub-controller can include only a single operator process for communication of the control processes.

In an exemplary embodiment, the operator process is configured to communicate with the individual control processes of the respective secondary sub-controller. In an exemplary embodiment, this communication can be controlled by the operating system. In an exemplary embodiment, operating systems in which multiple processes can be executed simultaneously in an operating system environment possess functions configured to exchange data between the individual processes. In operation, the data exchange between individual processes within an operating system normally occurs significantly more quickly than the exchange of corresponding amounts of data via a data network. The exchange of data between two processes of an operating system environment is typically at least multiple time times faster (e.g. 100 times faster) than the exchange of corresponding amounts of data via a data network. The additional communication between the operator process and the individual control processes of the respective secondary sub-controller is therefore not an appreciable delay in the total time that is necessary for transferring data between two control processes of different secondary sub-controllers.

In an exemplary embodiment, the main sub-controller includes a mediator process that is configured such that the mediator process mediates (e.g. manages or otherwise controls) the exchange of data between two control processes of two different secondary sub-controllers such that the two control processes of the different secondary sub-controllers respectively exchange data directly via the operator processes of the respective secondary sub-controllers, without additional interposition of the main sub-controller.

In an exemplary embodiment, upon establishment of a data connection between two control processes of two different secondary sub-controllers, the corresponding operator processes of these secondary sub-controllers are connected with one another using the mediator process. In this example, the two operator processes then communicate directly with one another (using the mediator process). In an exemplary embodiment, the operator processes thus combine a one or more functions of naming services with one or more functions of a router. In an exemplary embodiment, the operator processes can be identified and connected by the mediator process with an individual address or an individual name or identifier (function of the naming service), and they then simultaneously execute the data transfer via the data network (router function).

Given conventional controllers in which control processes of different control modules are connected using a main module, the communication normally takes place using a communication process provided at the main sub-controller. The communication process may receive data from different control processes of the different sub-modules and may transmit data to these sub-modules. For transmission of data from one control process to another control process, a first data transfer hereby initially takes place from the sending control process to the communication process of the main module, and then a second data transfer takes place from the communication process of the main module to the other, receiving control process. The data network is hereby loaded twice with the same data set, whereby the transfer of the data takes place significantly more slowly compared to the controller according to one or more exemplary embodiments of the present disclosure, in which the operator processes of different secondary sub-controllers communicate directly with one another via the data network.

In an exemplary embodiment, the mediator process may be configured such that, given a mediation request of an operator process of a first secondary sub-controller, a port address or another identification information (for example an identifier) of a second secondary sub-controller is assigned with which the operator process of the first secondary sub-controller may transmit data to the operator process of the second secondary sub-controller.

In an exemplary embodiment, the operating system of the secondary sub-controllers is configured to control the communication between the control processes and the operator process of the respective secondary sub-controller. In this example, the communication may take place using a memory mapping. Such a communication within an operating system is very fast. This applies, in particular to memory mapping, in which large data sets may be passed from one process to another process with a few small processor instructions. The communication of the control processes within a secondary sub-controller may be configured as a mailbox system.

In an exemplary embodiment, the data network for transferring data may be designed according to the TCP protocol, but is not limited thereto and can be configured for one or more other communication protocols in addition to, or as an alternative to, the TCP protocol.

In an exemplary embodiment, only the respective one operator process of each secondary sub-controller has and executes a TCP server and a TCP client, and the control processes of the respective secondary sub-controller are configured without a TCP server and a TCP client.

In an exemplary embodiment, one or more (or each) secondary sub-controller includes only a single operator process, or only a single process that includes the necessary infrastructure (e.g. communication transceiver) for communication with the data network.

In an exemplary embodiment, the data network may be configured according to the Ethernet standard, a standard according to Synchronous Data Link Control (SDLC), ProfiBus or Arcnet, or one or more other communication standards as would be understood by one of ordinary skill in the relevant arts.

In an exemplary embodiment, one or more (or each) control process is an instance of a corresponding control program at the secondary sub-controller which includes its own address space. Processes may normally run in pseudo-parallel and use a communication system to synchronize their tasks.

According to a further aspect of the present disclosure, a printing device (e.g. printer) is provided for printing to a recording medium. The printing device can include multiple print groups configured to apply a respective predetermined print color onto the recording medium. The printing device can include a controller, such as the controller according to one or more of the exemplary embodiments described herein. The controller can include a main sub-controller and respective secondary sub-controllers associated with each print group to control the respective print group.

With a controller according to one or more exemplary embodiments, the individual print groups and other stations of the printer may be simply and cost-effectively connected with a data network, and a plurality of such components and stations may be reliably controlled. In an exemplary embodiment, all data (control commands, parameters etc.) for controlling the individual print groups and stations of the printing device are transferred via this data network. In an exemplary embodiment, the data network does not transfer print data. In this example, separate data connections (e.g. serial data connections and/or data connections with optical waveguides) which are independent of the data network for controlling the individual print groups and stations in the printing device, are used to transfer the print data.

In an exemplary embodiment, the printer may have a log station which regularly receives parameters from multiple components of the printing device, for example print groups. The log station can be configured to archive these parameters. The data to be archived can be designated as log data. Given large printing apparatuses with multiple print groups, a fixing station and additional workstations (e.g. a rastering station, a color management station or the like), the log data may have a significant data volume in the data network. In an exemplary embodiment, the controller is configured such that the operator processes connected with one another communicate directly via the data network without the main sub-controller being interposed. This significantly facilitates the transfer of all log data and the necessary control data. For example, the log data may include at least 500 data sets per second, at least 1000 data sets per second, or at least 5000 data sets per second, but is not limited thereto. These data sets normally have a data volume of not more than, for example, 1.5 Kbytes. The data sets on average include a data volume of, for example, approximately 100 bytes to 300 bytes.

Furthermore, the present disclosure relates to a method for operating a controller configured to control an apparatus (e.g. printer). In an exemplary embodiment, the controller can include multiple sub-controllers which are connected via a data network, and each sub-controller includes at least one processor and an operating system. In an exemplary embodiment, one of the sub-controllers is configured as a main sub-controller and the other sub-controller(s) are configured as secondary sub-controllers. In this arrangement, one or more control processes which exchange data with other control processes can be executed at each secondary sub-controller. In a method according to an exemplary embodiment, the control processes of each secondary sub-controller communicate exclusively with an operator process of their secondary sub-controller via the data network.

In an exemplary embodiment, the control processes of one or more secondary sub-controller communicate exclusively with the operator process of the one or more secondary sub-controller. For example, the control processes of each secondary sub-controller communicate exclusively with the operator process of each secondary sub-controller. As a result, a simple communication structure is achieved which can be implemented simply and executed reliably in a complex system.

In an exemplary embodiment, in addition to their function as a component of the controller, the secondary sub-controllers may in principle also have other functions and include processes independent of the main sub-controller (and/or other controller components), which processes may also access the data network. However, the secondary sub-controllers can be configured so that the secondary sub-controllers include only the operator process and the control processes belonging to the controller (or main sub-controller), in addition to the operating system processes necessary for operation of the secondary sub-controllers.

In an exemplary embodiment, the method may include the exchange of data between two control processes of two different secondary sub-controllers in that a mediator process of the main sub-controller initially connects the corresponding secondary sub-controllers or their operator processes such that the two control processes of the secondary sub-controllers respectively exchange data directly via the operator processes of the respective secondary sub-controllers, without additional interposition of the main sub-controller. Only the operator processes hereby communicate with the data network, and not the control processes, which transfer their data via the data network by means of the operator processes.

FIG. 1 illustrates a printing device (printer) 1 including a controller according to an exemplary embodiment of the present disclosure. The printing device 1 can include an unrolling station 2, four print groups 3-6, a fixing station 7, a roll-up station 8, a rastering station 9 and a color management station 10. A roll 11 with a recording medium may be provided at the unrolling station 2. The recording medium is typically a band-shaped paper. From the unrolling station 2, a recording medium web 12 extends through the print groups 3-6 and the fixing station 7 up to the roll-up station 8. Located in the roll-up station 8 is an additional roll 13 for rolling up the printed recording medium.

The rastering station 9 is connected with a print server 15 via a data line 14. The print server has a connection to a LAN, a WAN, or to the Internet 16, and is connected with computers at which print jobs are generated, which print jobs are then transmitted to the print server 15. The print server 15 relays the print jobs, or print data extracted from the print jobs, to the rastering station 9, in which the print data are rastered according to the requirements of the print groups 3-6. Depending on the type of print head, there are different types of rastering. The print data may be rastered in a binary raster pattern. The print data can be rastered in a multi-level raster pattern, which, for example, may be used in inkjet print groups or liquid toner print groups. The rastering station 9 is connected via serial high-speed data lines 17 with the respective print groups 3-6 in order to determine a rastered color separation at the respective print groups, with which color separation the print group may be controlled directly.

The color management station 10 is configured to supply the individual print groups 3-6 with the respective color. Such a color management station 10 is primarily appropriate in printing devices which operate with liquid toner.

In an exemplary embodiment, the printing device (printer) 1 includes a controller 26 having a main sub-controller 18, or a central controller 18 and one or more secondary sub-controllers which are connected with the main sub-controller 18 via a data network 20. In an exemplary embodiment, the controller 26 includes a main sub-controller 18 and two or more secondary sub-controllers 19. In an exemplary embodiment, the controller 26 includes processor circuitry that is configured to perform one or more functions and/or operations of the controller 26. In this example, the sub-controller 18 and/or the sub-controller 19 can include processor circuitry that is configured to perform one or more functions and/or operations of the sub-controllers 18, 19.

In an exemplary embodiment, each print group 3-6 and each workstation 2, 7-10 of the printing device 1 are provided with a secondary sub-controller 19, which is configured to receive data from the print groups 3-6 and/or workstations 2, 7-10, and/or transmit control data to the print groups 3-6 and/or workstations 2, 7-10 with a digital and/or analog interface. The secondary sub-controllers 19 may also be directly provided or connected with sensors which gather corresponding data at the print groups 3-6 and/or workstations 2, 7-10. Embodiments are not limited to each print group 3-6 and/or each workstation 2, 7-10 having a corresponding secondary sub-controller 19, and one or more of these components can be implemented without a secondary sub-controller 19.

In an exemplary embodiment, the printing device 1 furthermore includes a log station 21 which is coupled to the data network 20. In an exemplary embodiment, the log station 21 includes processor circuitry that is configured to perform one or more functions and/or operations of the log station 21 (e.g. gather and maintain information, such as one of more logs).

As illustrated in FIG. 2, in an exemplary embodiment, a mediator process 22 is stored and executable in the main sub-controller 18. A respective operator process 23 is stored and executable in the secondary sub-controllers 19. Furthermore, at least one control process 24 is stored and executable in the secondary sub-controllers 19. In an exemplary embodiment, the control process 24 contains the functionality to control the print groups 3-6 or the workstations 2, 7-10. These functionalities include the acquisition of measurement data or parameters, transmission or execution of control commands, and/or transmission of control data to the respective print groups 3-6 or workstations 2, 7-10.

In an exemplary embodiment, the control processes 24 of a secondary sub-controller 19 may be configured to communicate among one another and with the operator process 23 of the respective secondary sub-controller. In an exemplary embodiment, the control processes 24 are configured such that they cannot directly access the data network 20 and cannot send data or receive data from the data network 20. In an exemplary embodiment, the operator process 23 of the respective secondary sub-controller 19 is exclusively connected to the data network 20 and may receive data from and/or transmit data via the data network 20.

In an exemplary embodiment, the communication between the processes of a secondary sub-controller is controlled by the respective operating system of the secondary sub-controller 19. The communication between the processes can take place using, for example, a mailbox system. In this example, the memory ranges may be mapped. Large data sets may hereby be exchanged very quickly between individual processes within a secondary sub-controller.

In an exemplary embodiment, the data network 20 is an Ethernet network that realizes the data communication according to the TCP protocol, but is not limited to these protocols and/or standards. In an exemplary embodiment, the operator processes 23 therefore respectively can include a TCO server to transmit data via the data network 20 and a TCP client to receive data from the data network 20. Furthermore, in an exemplary embodiment, only the operator processes 23 of the respective secondary sub-controllers have the additional necessary infrastructure for communication with the data network 20. The data network 20 can be a wired and/or wireless network.

In the following, an exemplary operation of the controller 26 is described.

In an exemplary embodiment, at a first secondary sub-controller 19/1, a first control process 24/1 at the operator process 23/1 of the first control sub-controller 19/1 queries which additional control process of the controller has a specific control datum. Via the data network 20, the operator process 23/1 queries in the mediator process 22 of the main sub-controller 18 as to which control process has this control datum. The mediator process 22 queries the operator processes 23 of the additional secondary sub-controllers 19 as to whether their control processes 24 have the control datum. The operator processes 23 query the respective control processes 24 as to whether they have the corresponding control datum.

In an exemplary embodiment, from a second operator process 23/2 of a second secondary sub-controller 19/2, the mediator process 22 receives the response that a second control process 24/2 of the second control sub-controller 19/2 has this control datum, after the control process 24/2 has communicated this to the operator process 23/2. The mediator process 22 at the first operator process 23/1 hereupon communicates information to the second control process 24/2 that this contains the control datum. This information can also include connection information for the second operator process 23/2. This connection information may be, for example, an address in the data network (e.g. IP address) or an identifier assigned to the respective operator process 23. With this connection information, the first operator process 23/1 establishes a direct connection 25 (e.g. direct communicative coupling) to the second operator process 23/2 via the data network 20 in order to request the control datum of the second control process 24/2. The control datum is then requested by the second operator process 23/2 of the second control process 24/2 and then is transmitted via the data network from the operator process 23/2 to the first operator process 23/1. This forwards the control datum to the first control process 24/1.

This method of operation is advantageous, in particular, when the control datum includes not a single data value but rather an extensive data set. This control datum may then be transferred directly from one operator process 23 to another operator process 23, wherein the full mediator functionality of the mediator process 22 is available as it is known from previous systems. In an exemplary embodiment, in a data network, different communication systems may be combined with one another. Given a pure network communication, a process is identified by its IP address and/or protocol number. Given a QNX queue, a process ID (pid) is used together with a channel ID. A name may be associated at the operating system layer.

In an exemplary embodiment, in such a communication system, a mediator process or multiple hierarchically arranged mediator processes may be used to mediate/manage an exchange of data between two processes.

Given a system with hierarchical mediator processes, a subordinate mediator process can register with the respective superordinate mediator process as soon as it is active. This system of mediator processes allows a dynamic association of the identifiers. In the event that a corresponding mediator process, or the sub-controller that has this mediator process, is not active, a communication with this mediator process cannot be connected. In such an instance, a superordinate mediator process refuses the communication request.

In an exemplary embodiment, so that the communication may be executed smoothly in such a data network, the mediator process 22 can include the full mediator functionality with which it may resolve an identifier transmitted to it by a process. For this, the mediator process 22 is asked whether it knows an identifier of a datum. For this, the mediator process 22 can receive this identifier as text. Name particles which designate connections can be known to the mediator process. These name particles are contained in the identifier that is transmitted to it. Such name particles are, for example, "PQ1", "PQ2" and "LQ" for the first print group 3, the second print group 4 and the color management station 10.

In an exemplary embodiment, if the mediator process 22 is asked for the identifier of a datum, for example "LQ.Lq-Main.Temperature", the mediator process 22 knows that it must relay the request to the color management station 10 that is designated by the name particle "LQ". Since it knows a corresponding connection, the mediator process 22 executes this. This color management station 10 in turn has a mediator process which may associate the name particle "LqMain" with a local process. The process "LqMain" knows its datum "Temperature" and responds affirmatively. The chain from requesting process to the datum is therefore known. In order to query a datum, the operator process initially uses the mediator process 22 which relays the connection to an additional mediator process or to a process that has the datum. In conventional methods, the addressed process replies again on the same route. In the method according to the present disclosure, the data transfer takes place directly to the respective operator process. In addition to the mediator process 22, additional mediator processes that are subordinate to the mediator process 22 of the main sub-controller 18 may be involved in the establishment of the connection.

The method according to an exemplary embodiment of the present disclosure may be configured such that, after the connection (e.g. communicative coupling) has been established by the mediator process 22, the operator processes 23 communicate directly, or respectively communicate via a mediator process arranged immediately above these operator processes 23 in the hierarchy. The mediator process 22 of the main sub-controller 18, or additional interposed mediator processes that are implemented within the connection, are omitted given the direct communication between the operator processes 23. Furthermore, a data connection that is generated once for the transfer of a specific control datum may be used repeatedly between two operator processes 23 since the operator processes 23 store the reference of the control datum and of the data connection (connection information of the operator process or corresponding control process) and reuse it given a new request, without querying the mediator process.

The exemplary method has the following advantages:
  Only a single data transfer via the data network is required to transfer the data from one control process to another control process.
  Only the operator process 23 must hold the necessary infrastructure for the data communication via the data network. This on the one hand simplifies the communication structure, and on the other hand reduces the resource expenditure in the secondary sub-controllers in comparison to a system in which multiple control processes may access the data network.

Conclusion

The aforementioned description of the specific embodiments will so fully reveal the general nature of the disclosure that others can, by applying knowledge within the skill of the art, readily modify and/or adapt for various applications such specific embodiments, without undue experimentation, and without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, "processor circuitry" can include one or more circuits, one or more processors, logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. In one or more exemplary embodiments, the processor can include a memory, and the processor can be "hard-coded" with instructions to perform corresponding function(s) according to embodiments described herein. In these examples, the hard-coded instructions can be stored on the memory. Alternatively or additionally, the processor can access an internal and/or external memory to retrieve instructions stored in the internal and/or external memory, which when executed by the processor, perform the corresponding function(s) associated with the processor, and/or one or more functions and/or operations related to the operation of a component having the processor included therein.

In one or more of the exemplary embodiments described herein, the memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

REFERENCE LIST 1 printing device (e.g. printer)
2 unrolling station
3 print group
4 print group
5 print group
6 print group
7 fixing station
8 roll-up station
9 rastering station
10 color management station
11 roll
12 recording medium web
13 roll
14 data line
15 print server
16 Internet
17 serial data line
18 main sub-controller
19 secondary sub-controller
20 data network
21 log station
22 mediator process
23 operator process
24 control process
25 direct connection
26 controller (that includes the sub-controllers 18, 19)

The invention claimed is:

1. A controller to control an apparatus, comprising:
multiple secondary sub-controllers, each including an operator process and one or more executable control processes, each of the control processes being configured to exchange data with one or more other of the control processes; and
a main sub-controller communicatively coupled to the secondary sub-controllers via a data network, each of the main and secondary sub-controllers including at least one processor and an operating system, the main sub-controller further including hierarchically arranged mediator processes that are each configured to mediate the exchange of data between the secondary sub-controllers,
wherein the respective operator processes are configured to communicate via the data network, the control processes of each of the secondary sub-controllers being configured such that the control processes communicate exclusively with the operator process of their respective secondary sub-controller to communicate via the data network based on the mediation of the exchange of data by the hierarchically arranged mediator processes.

2. The controller according to claim 1, wherein:
the hierarchically arranged mediator processes are each configured such that, upon an exchange of data between two control processes of two different secondary sub-controllers of the multiple secondary sub-controllers, the hierarchically arranged mediator processes respectively mediate the exchange of the data such that the two control processes of the different secondary sub-controllers respectively exchange data directly, without additional interposition of the main sub-controller, via the operator processes of the respective two different secondary sub-controllers.

3. The controller according to claim 2, wherein:
the hierarchically arranged mediator processes are each configured such that, given a mediation request of an operator process of a first of the multiple secondary sub-controllers, a connection information is assigned to a second of the multiple secondary sub-controllers, and
the operator process of the first secondary sub-controller being configured to transmit data to the operator process of the second secondary sub-controller using the connection information of the operator process of the first secondary sub-controller.

4. The controller according to claim 3, wherein the connection information comprises a port address or an identifier.

5. The controller according to claim 1, wherein:
the respective operating system of the secondary sub-controller is configured to control the communication between the one or more respective control processes and the operator process of the secondary sub-controller, and
the communication between the one or more respective control processes and the operator process takes place using a memory mapping.

6. The controller according to claim 1, wherein the data network is configured to transfer the data according to the Transmission Control Protocol (TCP) protocol.

7. The controller according to claim 6, wherein only the operator process of each secondary sub-controller executes a TCP server and a TCP client.

8. The controller according to claim 1, wherein each secondary sub-controller comprises only a single operator process.

9. The controller according to claim 1, wherein the data network is configured according to the Ethernet standard or a standard according to Synchronous Data Link Control (SDLC), ProfiBus or Arcnet.

10. The controller according to claim 1, wherein each control process is an instance of a corresponding control program at the secondary sub-controller and comprises its own address space.

11. A printer configured to print to a recording medium, comprising:
multiple print groups configured to apply a respective predetermined print color onto the recording medium; and
a controller according to claim 1, wherein each of the multiple print groups includes a secondary sub-controller of the multiple secondary sub-controllers.

12. The printer according to claim 11, further comprising a log station that is configured to:
regularly receive parameters from multiple components of the printing device, the multiple components including the multiple print groups, and
archive the received parameters.

13. The controller according to claim 1, wherein, upon activation, a subordinate mediator process of the hierarchical arranged mediator processes is configured to register with a respective superordinate mediator process of the hierarchical arranged mediator processes.

14. The controller according to claim 13, wherein the superordinate mediator process is configured to approve or deny a communication request for the subordinate mediator process based on whether the subordinate mediator process is active.

15. A method for operation of a controller to control an apparatus, the controller including multiple sub-controllers connected via a data network, wherein each sub-controller includes at least one processor and an operating system, one of the sub-controllers being configured as a main sub-controller and the other sub-controllers being configured as secondary sub-controllers, the main sub-controller further including hierarchically arranged mediator processes that are each configured to mediate the exchange of data between the secondary sub-controllers, the method comprising:

mediating, by the hierarchically arranged mediator processes, the exchanging of data between one or more control processes of one of the secondary sub-controllers with one or more other control processes, the one or more control processes of one of the secondary sub-controllers and the one or more other control processes being executable at each of the secondary sub-controller; and communicating via the data network, by the control processes of each of the secondary sub-controllers, exclusively using a respective operator process of each of the secondary sub-controllers based on the mediation of the exchange of data by the hierarchically arranged mediator processes.

16. The method according to claim 15, wherein the communicating comprises:

communicatively coupling two of the secondary sub-controllers together using a respective one of the hierarchically arranged mediator processes of the main sub-controller; and directly exchanging data between two control processes of the coupled secondary sub-controllers via the operator processes of the respective coupled secondary sub-controllers without direct interposition of the main sub-controller.

* * * * *